April 2, 1963 R. M. SMITH 3,084,067
PRESSURE-SENSITIVE ADHESIVE SHEET HAVING HYDROPHILIC FILM
BACKING AND PRIMER OF RUBBERY LATEX, HYDROPHILIC
METHYLOLATED POLYACRYLAMIDE, AND ACID
CATALYST AND METHOD OF MAKING IT
Filed July 13, 1960
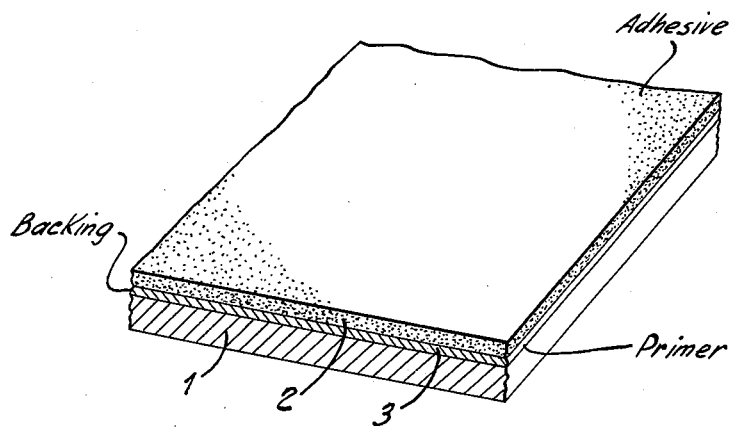
INVENTOR
RICHARD M. SMITH
BY
Charles A. Harris
ATTORNEY 3,084,067
PRESSURE-SENSITIVE ADHESIVE SHEET HAVING HYDROPHILIC FILM BACKING AND PRIMER OF RUBBERY LATEX, HYDROPHILIC METHYLOLATED POLYACRYLAMIDE, AND ACID CATALYST AND METHOD OF MAKING IT
Richard Myles Smith, New Brunswick, N.J., assignor to Johnson & Johnson, a corporation of New Jersey
Filed July 13, 1960, Ser. No. 42,515
10 Claims. (Cl. 117—76)

The present invention relates to pressure-sensitive adhesive sheets and tapes of the type comprising a relatively smooth non-porous hydrophilic film backing of a material such as regenerated cellulose, or cellophane, and a rubbery hydrophobic pressure-sensitive adhesive coated on one side of the backing.

Heretofore, it has been recognized that there is a serious problem in bonding rubbery hydrophobic adhesive materials to hydrophilic backing films of the type described above, since there is little opportunity for the rubber to penetrate the relatively smooth non-porous surface of the backing and chemical affinity between the backing and the adhesive is quite low. Various types of primer materials have been applied in the form of a film or layer between the backing and the adhesive to bond the two together. In particular, a type of primer consisting essentially of a mixture of a rubbery latex and a hydrophilic colloidal agglutinate, or some other hydrophilic agglutinate, has been used to bond hydrophilic backing films to hydrophobic adhesives in products of this type. In such primers, the rubbery latex and the hydrophilic agglutinate materials are thoroughly mixed; and it is believed that particles of the hydrophilic agglutinate in the mixture exhibit particular affinity for the hydrophilic backing, while particles of the rubbery latex exhibit particular affinity for the pressure-sensitive adhesive. Thus, the hydrophilic backing and the hydrophobic adhesive layer are bonded firmly together by virtue of the cohesive strength of the primer layer and the above-described affinity of the two main components of the primer layer for the backing and the adhesive.

The above-described action of the primer layer is of particular importance in pressure-sensitive adhesive tapes of the type which is adapted to be wound upon itself in roll form, since the relationships described allow the tape to be unwound without offsetting or delamination of the adhesive from the tape. To accomplish this, it first is necessary that the cohesive strength of the adhesive layer be greater than the strength with which it adheres to the back of the tape backing on which it is wound. More importantly from the standpoint of this invention, it is necessary that the adhesive layer in the tape adhere to the backing via the primer layer more firmly than if the primer were omitted, as described above, with the result that when the tape is unwound the adhesive will remain adhered to the backing through the primer layer and will not delaminate or peel off onto the opposite side of the backing.

Prior art primers of the type comprising a hydrophilic agglutinate provide adequate bonding between the backing and adhesive layer under dry conditions, but seem to weaken rapidly with increased moisture with the result that they are not satisfactory under very moist conditions.

This invention contemplates adhesive sheets and tapes of the type generally described above having a novel primer layer based upon a mixture of a rubbery latex and a hydrophilic agglutinate, wherein greatly improved bonding is provided between the adhesive layer and the backing under moist and even wet conditions. This is accomplished by employing a hydrophilic methylolated polyacrylamide as the hydrophilic agglutinate in a primer mixture with an acid stable rubbery latex and a sufficient amount of an acid catalyst to maintain the pH of the mixture between about 6 and 2, preferably about 3-2. The primer is applied to the backing layer in the form of an aqueous emulsion by a suitable coating technique such as knife coating, padding, or the like; and the resulting coated backing then is dried to provide a primer layer which is the deposition product of the aqueous emulsion. The hydrophobic adhesive material is applied to the primer layer by any suitable coating technique to provide a pressure-sensitive adhesive layer of the desired thickness, and the resulting tape is dried to provide a finished product.

Preferably, the primer mixture comprises approximately 100 parts of the acid stable rubbery latex and about 10-200 parts of the methylolated polyacrylamide. Various acid catalysts including maleic anhydride, 1 normal hydrochloric acid and 1 normal acetic acid may be used according to this invention. Maleic anhydride has been found particularly suitable for this purpose. With maleic anhydride, it is preferred that about 5-900 parts by weight catalyst to 100 parts methylolated polyacrylamide-latex mixture be used and extremely good wet bonding or anchorage between the layers is achieved at above about 50 parts maleic anhydride.

It is preferred that the methylolated polyacrylamide be prepared by reacting about 40-300 parts of a hydrophilic polyacrylamide with about 100 parts of formaldehyde with heat. Typically a polyacrylamide such as designated PAM 100, PAM 50, PAM 10, etc., by the American Cyanamid Company is dissolved in water and added slowly to a solution of formaldehyde in water while stirring at a relatively low temperature such as 50° C. during a period of two hours or so; and the resulting liquid is heated for an additional period of about two hours at the same temperature. Enough water is added to the polyacrylamide-formaldehyde mixture to provide a reaction product of the desired viscosity. The resulting reaction product is cooled and then mixed with the acid stable rubbery latex while agitating the mixture at about 30° C. or at room temperature if it is in this range. Normally, the acid catalyst then is added to the mixture of methylolated polyacrylamide and latex, again while stirring the mixture.

Any suitable latex may be employed which has good affinity for the hydrophobic pressure-sensitive adhesive and which may be made stable on the acid side. Natural rubber and synthetic rubbers such as GRS (butadiene-styrene) and neoprene latices and the like may be employed. Dow 512K manufactured by Dow Chemical Co. is typical of a GRS latex which is known to be very satisfactory for use according to this invention, and which needs no additional stabilization. Other anionic latices, which are stable only on the alkaline side, may be made stable on the acid side by addition of nonionic emulsifiers or mixtures of nonionic and cationic emulsifiers. An example of a suitable nonionic emulsifier is Emulphor ON–870, the reaction product of oleyl alcohol with 30 mols of ethylene oxide, manufactured by Antara Chemicals, a division of General Aniline and Film Corp. In most cases the nonionic emulsifier by itself will sufficiently stabilize the latex. In the few instances where this is not so a cationic emulsifier, such as Triton X400 (stearyl dimethyl benzyl ammonium chloride) manufactured by Rohm and Haas, may be used in conjunction with the nonionic emulsifier.

When a primer mixture prepared in the above-described manner is used in the manufacture of pressure-sensitive adhesive tape, excellent dry anchorage and unusually good anchorage under very moist and wet conditions are attained. Dry anchorage is measured by making a special test sample and stripping it in a standard Thwing-Albert tensile tester as follows. The test sample is made by coating the backing with a primer layer of normal thickness and then applying a double thickness of the hydrophobic pressure-sensitive adhesive. While the adhesive still is wet, a woven fabric is pressed into the exposed side of the adhesive layer to such an extent that adherence between the fabric and the adhesive will be greater than the coherence of the adhesive layer itself. The resulting laminate then is dried and cut into test strips one inch wide. At the end of the sample the backing and the fabric are left accessible for gripping in the opposite jaws of the tensile tester. For measuring anchorage the backing is placed in one jaw of the tensile tester, and the fabric at the same end of the test sample strip is placed in the other end of the tensile tester, and the jaws are separated at a rate of approximately 33 inches per minute. The tape extending below the end, which is the portion not yet stripped or pulled apart, is held up under the fabric portion of the end of the tape clamped in the testing jaw in a plane approximately parallel to the fabric. In other words, the fabric during stripping is folded back upon itself, whereas the backing is held out approximately straight. The average stripping force in ounces then becomes the dry anchorage value. Wet anchorage is measured in the same way as dry anchorage with the exception that the sample strip is soaked in water for one hour before testing. Using these techniques for measuring anchorage, any dry anchorage value over 60 ounces is considered quite good; and a dry anchorage value over 40 ounces is considered satisfactory. On the other hand, any wet anchorage value over 1 ounce is considered quite satisfactory even though higher wet anchorage values are preferred. The great difference between the acceptable values for dry and wet anchorage reflects the measuring technique employed. Even though pressure-sensitive tape of this type would seldom, if ever, be immersed in water for an hour, it is felt that if the tape exhibits appreciable anchorage after immersion in water for this period of time it also will exhibit satisfactory anchorage of a much higher order under moisture conditions of the type which normally will be encountered in use.

Other and further advantages of the invention will be apparent from the following description and claims taken together with the drawing wherein there is shown a partial cross-sectional view of an adhesive sheet according to this invention. The sheet comprises a backing 1 of a conventional hydrophilic material such as cellophane, a pressure-sensitive adhesive layer 2 and a primer layer 3 between the backing and the pressure-sensitive layer. The pressure-sensitive adhesive is a conventional hydrophobic adhesive material and the primer is an an acid catalyzed mixture of a rubbery latex and a methylolated polyacrylamide, according to this invention.

The invention will be illustrated further by way of the following Examples I-XX for which specific data is set forth in Table A below:

| | PAM to Formaldehyde Ratio | Type PAM | Dow 512K PAM Ratio | Acid Catalyst | Dry Anchorage, ounces/in. | Wet Anchorage, ounces/in. | Approximate pH |
|---|---|---|---|---|---|---|---|
| I | 40/60 | Cyanomer P250 | 67/33 | HCl | 74 | .9 | 3-2 |
| II | 55/45 | Cyanomer P250 | 67/33 | 16MA | 62 | 4.4 | 3-2 |
| III | 63/37 | PAM 50 | 67/33 | 16MA | 71 | 3.1 | 3-2 |
| IV | 65/35 | PAM 50 | 67/33 | 16 MA | 46 | 4.2 | 3-2 |
| V | 67/33 | PAM 10 | 67/33 | 16MA | 77 | 2.0 | 3-2 |
| VI | 67/33 | Cyanomer P26 | 67/33 | 16MA | 68 | 3.6 | 3-2 |
| VII | 67/33 | PAM 75 | 67/33 | 16MA | 81 | 3.2 | 3-2 |
| VIII | 67/33 | PAM 100 | 67/33 | 16MA | 77 | 3.6 | 3-2 |
| IX | 70/30 | PAM 75 | 67/33 | 16MA | 76 | 3.9 | 3-2 |
| X | 75/25 | PAM 10 | 67/33 | 16MA | 42 | 1.1 | 3-2 |
| XI | 70/30 | PAM 50 | 67/33 | HAc | 85 | 2.7 | 3-2 |
| XII | 67/33 | PAM 75 | 67/33 | 16MA | 81 | 3.2 | 3-2 |
| XIII | 67/33 | PAM 75 | 67/33 | 32MA | 89 | 5.1 | 3-2 |
| XIV | 67/33 | PAM 100 | 67/33 | 64MA | 69 | 8.7 | 3-2 |
| XV | 67/33 | PAM 100 | 67/33 | 128MA | 54 | 8.3 | 3-2 |
| XVI | 67/33 | PAM 50 | 67/33 | 300MA | 80 | 10.9 | 3-2 |
| XVII | 67/33 | PAM 50 | 67/33 | 900MA | 72 | 14.0 | 3-2 |
| XVIII | 67/33 | PAM 100 | 67/33 | HCl | 76 | .9 | 6 |
| XIX | 67/33 | PAM 100 | 67/33 | HCl | 74 | 1.3 | 4 |
| XX | 67/33 | PAM 100 | 67/33 | HCl | 72 | 2.5 | 2 |

Test samples for the purpose of measuring drying and wet anchorage for these examples are made in accordance with the above-described procedure for making such samples. In each case the indicated proportions of polyacrylamide and formaldehyde are reacted as described hereinbefore to provide a methylolated polyacrylamide which in turn is mixed with the Dow 512K GRS rubbery latex and the acid catalyst, indicated, to provide a primer according to this invention. As indicated in the first column of Table A, in Examples I-XIV various ratios of polyacrylamide to formaldehyde are employed. The second column of the table indicates various types of polyacrylamide expressed in terms of the designation given by the supplier, the American Cyanamid Company. Generally speaking, the size of the number reflects the molecular weight of the polyacrylamide. For instance, PAM 10 has quite a low molecular weight; and PAM Cyanamer P 250 represents a high molecular weight. All of the polyacrylamides are powders with the exception of PAM 10 which is a liquid. The polyacrylamide is slowly added to a 37 percent solution of formaldehyde in water while stirring at approximately 50° C. during a period of two hours after which the resulting mixture of polyacrylamide and formaldehyde is heated for another two hours to complete the reaction. The methylolated polyacrylamide reaction product is cooled to about 30° C. and mixed with the Dow 512K latex in the ratio indicated in the third column of Table A. The methylolated polyacrylamide is stirred into the latex which previously was kept at room temperature. The particular acid catalyst listed in the fourth column of the table is added in the proportions indicated to the resulting mixture while agitating the mixture. The proportions given in the fourth column of the table are based upon parts catalyst to 100 parts of the mixture of methylolated polyacrylamide and latex. In other words, these are percentage figures. The maleic anhydride used is in the form of solid crystals, and the hydrochloric acid and acetic acid both are in 1 normal solutions. Most of the samples are in the preferred range of pH of about 3-2 and all are within the range of 6-2. In each case the resulting primer is applied to a conventional cellophane backing for adhesive tapes as described above, and the primed backing is coated with a hydrophobic adhesive comprising a major proportion of pale crepe and minor proportions of a phenol modified polyterpene and a glycerine ester of hydrogenated rosin to form test samples as described hereinbefore. The dry anchorage values obtained range from 42 to 89 ounces, and the wet anchorage values range from .9 to 14 ounces. Most of the samples exhibit dry anchorage values well above 40 ounces. In fact, all but three of the samples have dry anchorage values above 60 ounces, which is considered to be excellent. The wet anchorage values are even more surprising. All but four of the samples exhibit wet anchorage values of 2 ounces or above, while 13 of them are above 3 ounces. The sheets of Examples XIV–XVII, wherein above about 50 parts maleic anhydride to 100 parts methylolated polyacrylamide-latex mixture is employed, all exhibit wet anchorage values over 8 ounces. This is exceptionally good. All of the samples are quite satisfactory from the standpoint of wet anchorage, and most of them are surprisingly superior from this standpoint.

Having now described the invention in specific detail and exemplified the manner in which it may be carried into practice, it will be readily apparent to those skilled in the art that innumerable variations, modifications, applications, and extensions of the basic principles involved may be made without departing from its spirit and scope.

The invention claimed is:

1. A pressure-sensitive adhesive sheet which comprises a hydrophilic film backing, a primer layer bonded to one side of said backing and essentially comprising the deposition product of a mixture of an acid stable rubbery latex, a hydrophilic methylolated polyacrylamide and a sufficient amount of an acid catalyst to maintain the pH of the mixture between about 6 and 2, and a layer of a hydrophobic rubbery pressure-sensitive adhesive bonded to the side of the primer layer opposite to said backing, said adhesive layer being bonded to the backing via the primer more firmly than if the primer were omitted, said pressure-sensitive adhesive sheet being highly resistant to the effects of moisture and high humidities and being adapted to be removed from surfaces to which temporarily applied without delamination or offsetting of adhesive.

2. A pressure-sensitive adhesive sheet which comprises a hydrophilic film backing, a primer layer bonded to one side of said backing and essentially comprising the deposition product of a mixture of 100 parts of an acid stable rubbery latex, 10–200 parts of a hydrophilic methylolated polyacrylamide and a sufficient amount of an acid catalyst to maintain the pH of the mixture between about 6 and 2, and a layer of a hydrophobic rubbery pressure-sensitive adhesive bonded to the side of the primer layer opposite to said backing, said adhesive layer being bonded to the backing via the primer more firmly than if the primer were omitted, said pressure-sensitive adhesive sheet being highly resistant to the effects of moisture and high humidities and being adapted to be removed from surfaces to which temporarily applied without delamination or offsetting of adhesive.

3. A pressure-sensitive adhesive sheet according to claim 2 wherein the amount of acid catalyst present is sufficient to maintain the pH of the mixture between about 3–2.

4. A pressure-sensitive adhesive sheet according to claim 2, wherein the acid catalyst is maleic anhydride in an amount within the range of about 5–900 parts catalyst to 100 parts of methylolated polyacrylamide-latex mixture.

5. A process for manufacturing a primer for pressure-sensitive adhesive tape having a relatively smooth hydrophilic backing and a pressure-sensitive adhesive layer on one side thereof, which comprises mixing about 10–200 parts of a hydrophilic methylolated polyacrylamide with about 100 parts of an acid stable rubbery latex and a sufficient amount of an acid catalyst to maintain the pH of the mixture between about 6 and 2.

6. A process according to claim 5, wherein the amount of acid catalyst present is sufficient to maintain the pH of the mixture between about 3 and 2.

7. A process according to claim 5, wherein the acid catalyst is maleic anhydride in an amount within the range of about 5–900 parts catalyst to 100 parts methylolated polyacrylamide-latex mixture.

8. A process for manufacturing a primer for pressure-sensitive adhesive tape having a relatively smooth hydrophilic backing and a pressure-sensitive adhesive layer on one side thereof, which comprises reacting about 40–300 parts of a hydrophilic polyacrylamide with about 100 parts of formaldehyde with heat to form a methylolated polyacrylamide, and mixing about 10–200 parts of the methylolated polyacrylamide reaction product with about 100 parts of an acid stable rubbery latex and a sufficient amount of an acid catalyst to maintain the pH of the mixture between about 6 and 2.

9. A primer suitable for use in the manufacture of pressure-sensitive adhesive tape which comprises about 10–200 parts of a methylolated polyacrylamide, about 100 parts of an acid stable rubbery latex and a sufficient amount of an acid catalyst to maintain the pH of the primer between about 6 and 2.

10. A primer according to claim 9 wherein the methylolated polyacrylamide is prepared by reacting about 40–300 parts of a polyacrylamide with about 100 parts of formaldehyde.

References Cited in the file of this patent

UNITED STATES PATENTS 2,795,515　　Lavanchy _____ June 11, 1957
2,926,105　　Steinhauser et al. _____ Feb. 23, 1960